US00RE38646E

(19) United States
(12) Reissued Patent
Gueret

(10) Patent Number: US RE38,646 E
(45) Date of Reissued Patent: Nov. 9, 2004

(54) BRUSH FOR APPLYING MAKEUP, A DEVICE FITTED THEREWITH, AND A METHOD OF MANUFACTURE

(75) Inventor: Jean-Louis Gueret, Paris (FR)

(73) Assignee: L'Oreal, Paris (FR)

(21) Appl. No.: 09/942,883

(22) Filed: Aug. 31, 2001

Related U.S. Patent Documents

Reissue of:
(64) Patent No.: 6,012,465
Issued: Jan. 11, 2000
Appl. No.: 09/236,471
Filed: Jan. 25, 1999

(30) Foreign Application Priority Data

Jan. 30, 1998 (FR) ..... 98 01063

(51) Int. Cl.[7] ..... A45D 40/26
(52) U.S. Cl. ..... 132/218; 132/216; 132/317; 132/318; 132/320; 15/206; 15/207.2
(58) Field of Search ..... 132/218, 317, 132/318, 319, 320; 401/118, 122, 126, 128, 129; 15/206, 207, 207.2; 428/400, 401; 264/178 F, 243, 209.1, 211.17; 300/21

(56) References Cited

U.S. PATENT DOCUMENTS 2,433,325 A 12/1947 Slaughter
3,121,040 A * 2/1964 Shaw et al. ..... 15/207.2
3,383,276 A 5/1968 Gould
4,559,268 A 12/1985 Nakashima et al.
4,733,425 A 3/1988 Hartel et al.
4,927,281 A * 5/1990 Gueret ..... 132/218
4,974,612 A 12/1990 Gueret
5,161,555 A 11/1992 Cansler et al.
5,335,465 A 8/1994 Gueret
5,567,072 A * 10/1996 Dunleavy et al. ..... 132/218
5,588,450 A 12/1996 Gueret
5,657,778 A * 8/1997 Gueret ..... 132/216

FOREIGN PATENT DOCUMENTS

JP A-58-73312 5/1983
JP U-2-142213 12/1990
WO WO 95/00050 1/1995

* cited by examiner

*Primary Examiner*—Pedro Philogene
(74) *Attorney, Agent, or Firm*—Oliff & Berridge, PLC

(57) ABSTRACT

The invention relates to a brush for applying makeup, in particular mascara, the brush comprising a core made up of two twisted-together lengths of wire between which bristles are held. At least some of said bristles are constituted by bristles of deformable section each having at least two zones of preferential deformation extending along the length thereof.

22 Claims, 2 Drawing Sheets

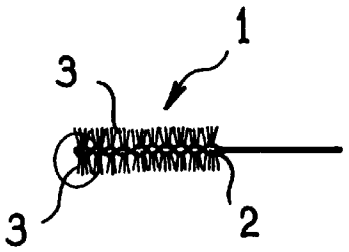
FIG.1
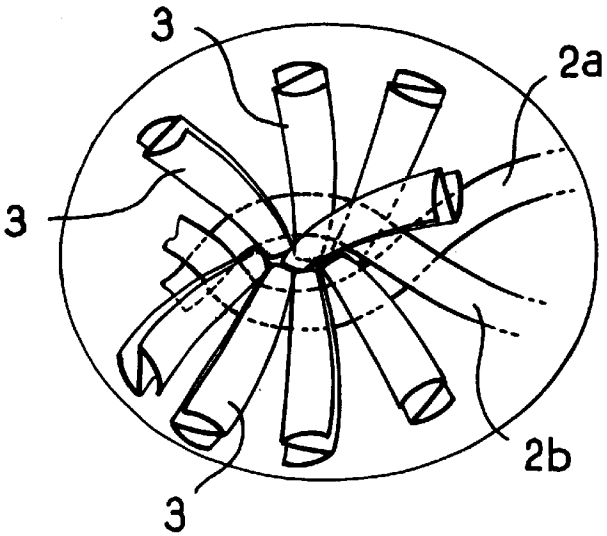
FIG.2
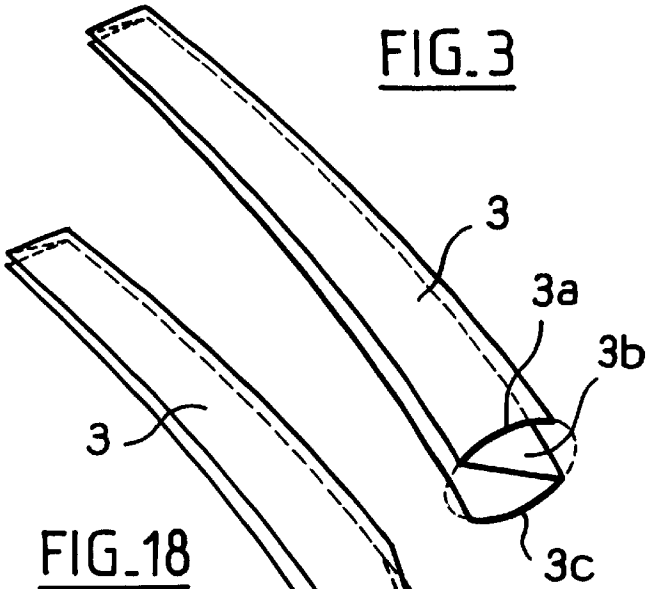
FIG.3
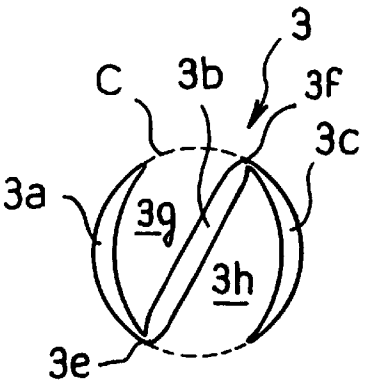
FIG.4
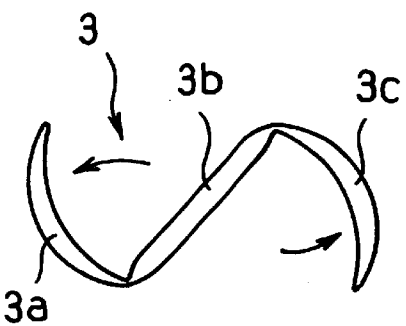
FIG.5
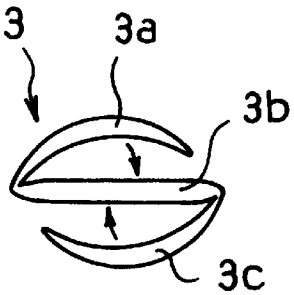
FIG.6
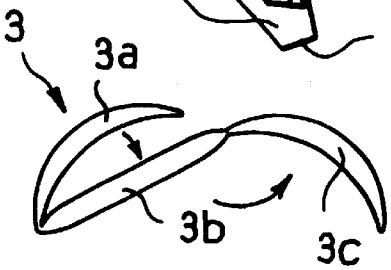
FIG.7
FIG.18

4
4a
4b
4c
4e
4f
C 5
5a
5b
5c
5d
5e
5f
5g 3
12

10
11

21
22
24
25

BRUSH FOR APPLYING MAKEUP, A DEVICE FITTED THEREWITH, AND A METHOD OF MANUFACTURE

Matter enclosed in heavy brackets [ ] appears in the original patent but forms no part of this reissue specification; matter printed in italics indicates the additions made by reissue.

The present invention relates to a brush for applying makeup, in particular mascara, the brush comprising a core comprising two lengths of twisted wire with bristles being held between them.

BACKGROUND OF THE INVENTION

A large number of brushes of that type are known, in particular from French patent 88 02114, however there remains a need for an improved brush, so that makeup can be applied well.

OBJECTS AND SUMMARY OF THE INVENTION

In the brush of the invention at least some of said bristles are constituted by bristles of deformable section, each having at least two zones of preferential deformation extending along the length thereof.

Deformable-section bristles of the invention thus present flexibility that depends on the direction in which a bending or compression force is applied to them.

They are preferably secured to the core of the brush with non-determined angular orientations about their own longitudinal axes, thereby ensuring that they cannot all be deformed in the same manner between the twisted lengths of wire constituting the core.

As a result, when the brush is passed over a wiper member, the bristles are not all wiped in the same manner and the makeup is distributed over the brush in a manner that is more favorable to applying makeup well than is the case with known brushes, e.g. having bristles of solid circular section, which offer the same resistance to bending regardless of the direction in which a bending force is applied to them.

The deformable-section bristles of the brush also extend in directions that diverge from the twisted lengths of wire of the core in which they are held.

This makes it easier for eyelashes to penetrate between the bristles of the brush, thereby enabling them to be better combed and better made up.

The deformable-section bristles of the invention are preferably made by extruding a plastics material, and in their extrusion configuration they present a crosssection whose outline is circular.

While the brush is being made, the bristles then behave substantially like bristles of solid circular section and they are easy to handle, particularly for the purpose of placing them between the lengths of wire that are to be twisted to make the brush.

In a particular embodiment, the zones of preferential deformation are zones of reduced thickness.

In another particular embodiment, the zones of preferential deformation are made of a material that is different from that or those from which the remainder of the bristle is made.

Still in a particular embodiment, at least one of the deformable-section bristles has at least two portions that are movable relative to a third portion, e.g. a middle portion to which the two side portions are hinged.

In a variant, at least one of the deformable-section bristles has two middle portions that are hinged together at one side and each of which is hinged at its other side to a side portion.

The invention also provides deformable-section bristles each having at least two zones of preferential deformation along its length.

The invention also provides a method of manufacturing a brush having a core comprising two twisted lengths of wire with bristles held between them, the method comprising the steps consisting in:

- extruding shaped strips of plastics material having at least three portions interconnected by zones of preferential deformation;
- cutting up said shaped strips to constitute deformable-section bristles;
- placing the deformable-section bristles obtained in this way between two lengths of wire, each deformable-section bristle being of arbitrary angular orientation about its own longitudinal axis; and
- twisting together the two lengths of wire to form turns between which said deformable-section bristles are held.

Preferably, the method further includes the step consisting in milling the bristles.

The invention also provides a conditioning and applicator device for a makeup such as mascara, the device comprising a reservoir containing said makeup, a wiper member, and an applicator comprising a stalk provided at one end with an applicator element and at its other end with a handle element also constituting a closure cap for the reservoir, wherein the applicator element is constituted by a brush as defined above.

BRIEF DESCRIPTION OF THE DRAWINGS

Other characteristics and advantages of the present invention appear on reading the following detailed description of non-limiting embodiments of the invention, and on examining the accompanying drawings, in which:

FIG. 1 is a diagrammatic view showing a brush constituting an embodiment of the invention prior to the bristles being milled;

FIG. 2 is a view on a larger scale of a detail of FIG. 1;

FIG. 3 shows in isolation and in perspective half of a deformable-section bristle constituting an embodiment of the invention;

FIGS. 4 to 7 show various configurations that can be taken up by the deformable-section bristle shown in FIG. 3;

FIG. 18 shows the FIG. 3 deformable-section bristle after it has been milled.

MORE DETAILED DESCRIPTION

Figures 8, 9, 10, 11, 12, 13, 14, 15, 16, 17, 19:
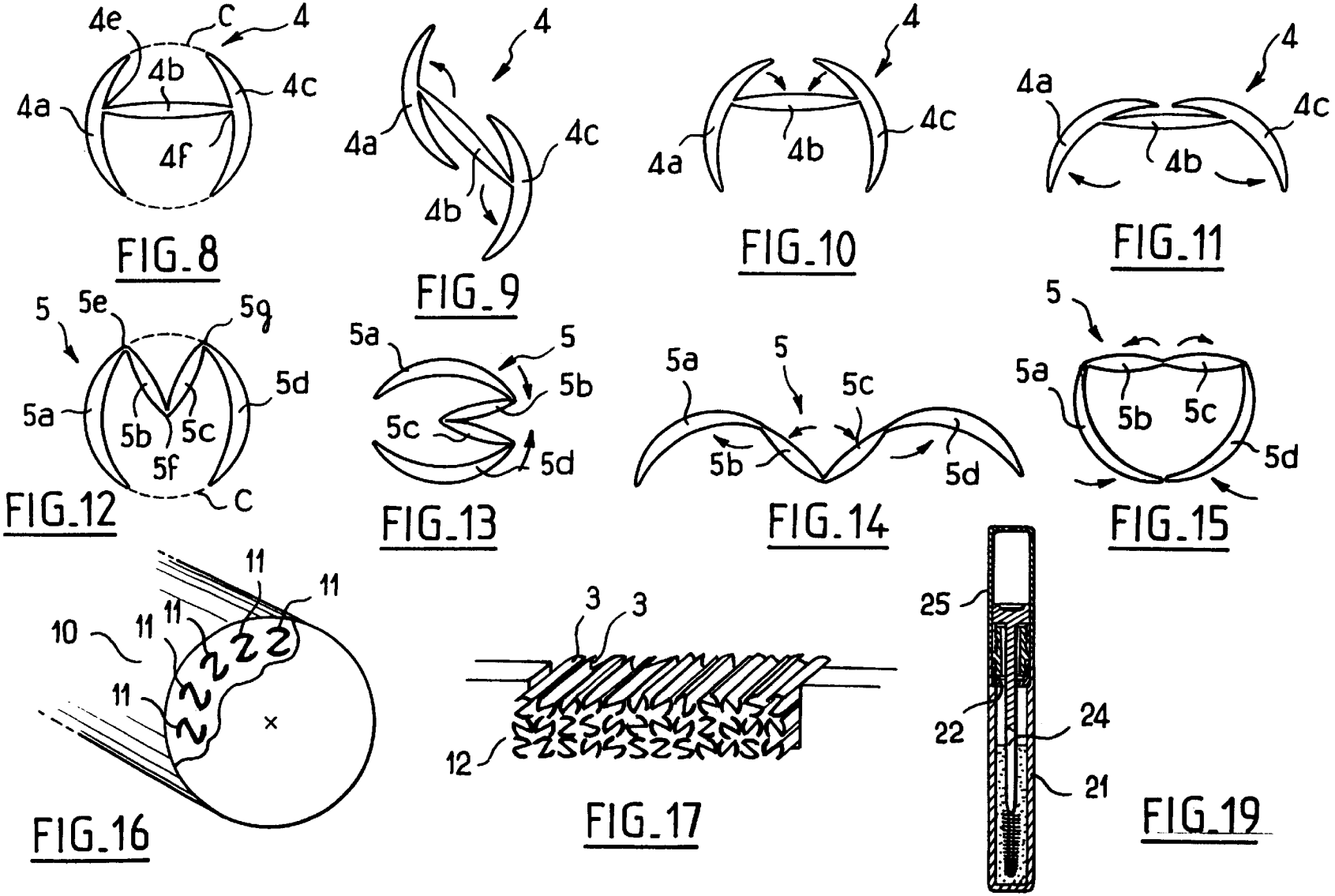
FIGS. 8 to 11 show various configurations that can be taken up by a deformable-section bristle constituting another embodiment of the invention.
FIGS. 12 to 15 show the various configurations that can be taken up by a deformable-section bristle constituting another embodiment of the invention.
FIG. 16 shows the extrusion of shaped strips for making deformable-section bristles as shown in FIG. 3.
FIG. 17 shows a certain number of bristles grouped together in each gap in a comb used for inserting them between two lengths of wire.
FIG. 19 shows a packaging and applicator device of the invention.

The brush 1 shown in FIG. 1 comprises a core 2 made up of two twisted-together lengths of wire for forming turns between which deformable-section bristles 3 are held.

FIG. 2 shows two lengths 2a and 2b of wire constituting the core 2 together with only a few bristles 3 in order to clarify the drawing. By way of example, each turn may contain five to 50 bristles, depending on the intended type of makeup.

The bristles 3 are held about halfway along their length between the lengths 2a and 2b of wire constituting the core 2. To clarify the drawing, only the forwardly-extending halves of the bristles are shown in FIG. 2.

FIG. 3 shows half of a bristle 3 in isolation.

The bristle 3 has a middle portion 3b and two side portions 3a and 3c and its cross-section is generally Z-shaped.

The middle portion 3b has a cross-section of lenticular profile while the side portions 3a and 3c are each of arcuate cross-section.

Each of them is hinged at one side to one of the sides of the middle portion 3b.

The bristles 3 are made by extruding a plastics material, e.g. a polyamide.

A the outlet from the die, as shown in FIG. 16, the bristles 3 have, in cross-section, the configuration shown in FIG. 4.

In this configuration, the side portions 3a and 3c are positioned so that their outwardly-convex outside faces lie on a circle C, while the middle portion 3b extends along a diameter of the circle C.

The bristle 3 has zones 3e and 3f of reduced thickness connecting the middle portion 3b to the side portions 3a and 3c respectively, thereby facilitating deformation of the bristles 3 along two fold lines.

The bristle 3 can deform in various ways, and only a few possible configurations are shown in FIGS. 5 to 7.

In particular, the bristle 3 can deform as shown in FIG. 5 by splaying apart its side portions 3a and 3c.

As shown in FIG. 6, the bristle 3 can also deform by its side portions 3a and 3c moving inwards so as to be folded down towards the middle portion 3b.

In a variant, only one of the two side portions 3a or 3c can be folded down towards the middle portion 3b, while the other one is folded away therefrom, as shown in FIG. 7.

For the bristles 3 shown in FIG. 2, it is assumed that where they are fixed to the core of the brush, i.e. about halfway along their lengths, the side portions 3a and 3c are folded down onto the middle portion 3b as shown in FIG. 6.

Nevertheless, where they are fixed to the core of the brush, the bristles 3 may be in some other configuration, and in particular they can be in one of the deployed or semi-deployed configurations corresponding to FIGS. 5 or 7 respectively.

As can be seen in FIG. 3, the cross-section of a bristle 3 varies as a function of position along the bristle 3.

In general, a deformable-section bristle of the invention tends to return to the configuration in which it was extruded on getting closer to its free ends.

Thus, in the example of FIG. 3, the bristle 3 tends to go from a folded configuration where it is fixed to the brush towards its extrusion configuration, as shown in FIG. 4, at its ends.

It will be observed that together the portions 3a & 3b or 3b & 3c can define cavities 3g and 3h in which makeup can accumulate. The bristles 3 can be loaded with makeup over their entire length.

FIGS. 8 to 11 show a second embodiment of a bristle of the invention, given reference 4. Like the above-described bristle 3, it has a middle portion 4b, and two side portions 4a and 4c which are united with the middle portion 4b via respective zones of reduced thickness 4e and 4f defining lines of preferential deformation.

FIG. 8 shows the configuration of the bristle 4 on leaving the extrusion die.

The cross-section of the bristle 4 is then generally H-shaped.

The side portions 4a and 4c have cross-sections of arcuate shape and the middle portion 4b has a cross-section of lenticular shape.

In the configuration of FIG. 8, the side portions 4a and 4c are positioned so that their outside faces occupy a circle C.

The middle portion 4b interconnects the concave faces of the side portions 4a and 4c.

FIGS. 9 to 11 show various configurations that the bristle 4 can take up by pivoting of its portions 4a and 4c.

In the example described, it will be observed that the middle portion 4b is not connected exactly to the middles of the concave faces of the side portions 4a and 4c, but is slightly offset upwards therefrom, thereby enabling the side portions 4a and 4c to take up the configuration shown in FIG. 11 where their top portions are folded down on the middle portion 4b.

The deformable-section bristle of the invention can have more than three hinged-together portions.

By way of example, FIGS. 12 to 15 show various configurations that can be taken up by a deformable-section bristle that is given reference 5, which bristle has two middle portions 5b and 5c that are hinged to each other along one side and that are hinged to respective side portions 5a and 5d along their opposite sides.

The cross-section of each of the middle portions 5b and 5c is lenticular in profile, and they are connected together by a zone of reduced thickness 5f defining a zone of preferential deformation.

The middle portions 5b and 5c are connected to the side portions 5a and 5d by zones of reduced thickness 5e and 5f likewise defining zones of preferential deformation.

In the configuration in which it is extruded, the bristle 5 has a cross-section that is generally M-shaped, its side portions 5a and 5d being positioned in such a manner that their convex outside faces occupy a circle C.

The bristle 5 can deform by the various portions thereof pivoting about the zones of preferential deformation. In particular, the middle portions 5b and 5c can fold against each other, as shown in FIG. 13.

The bristle 5 can also adopt a deployed configuration as shown in FIG. 14.

The bristle 5 can take up a configuration as shown in FIG. 15 in which its middle portions 5b and 5c are deployed and in which its side portions 5a and 5d are folded towards each other.

Each of the above-described bristles 3, 4, and 5 can naturally take up additional configurations that are not shown in the drawings.

As mentioned above, the bristles are made by extruding a plastics material, e.g. a polyamide, by means of a die 10 having a plurality of orifices 11.

The section of each orifice corresponds to the section of the bristle that is to be made, e.g. the bristle 3 in the die shown by way of example in FIG. 16.

Shaped strips of great length are extruded and are subsequently cut to the length desired for making the bristles 3 which are then stored in a bin.

The bin is used to feed a comb having gaps 12.

Only one such gap is shown in FIG. 17.

The bristles 3 contained in each gap 12 of the comb are parallel to each other but they take up nondetermined angular orientations about their own longitudinal axes. The bristles 3 contained in the gaps 12 of the comb are placed between two substantially parallel lengths of wire formed by folding a wire in half.

The two lengths of wire are held at each end in respective sets of jaws designed to be rotated relative to each other.

The bristles project by equal lengths on either side of the plane defined by the lengths of wire.

When the sets of jaws are rotated, the lengths of wire are twisted together, thereby forming turns between which the bristles 3 are held.

Thereafter, it is advantageous to mill the bristles to give the brush a desired profile.

FIG. 18 shows the FIG. 2 bristle after milling.

The effect of the milling depends on the direction in which the bristle extends relative to the abrasive surface and on the relative speed between the brush and the abrasive surface.

Milling can have the effect at the ends of the bristles of removing the zones of reduced thickness 3d and 3e linking together the portions 3a & 3b and 3b & 3c so that the portions are no longer hinged together at the ends of the bristles, thereby constituting forks 15 which improve combing of the eyelashes.

Milling can also have the effect of melting the plastics material of the bristles at their ends so as to form balls of material.

The way in which the bristles are milled is selected depending on the desired makeup effect.

FIG. 19 shows a packaging and applicator device comprising a reservoir 21 containing the makeup, a wiper member 22 constituted by an annular lip defining a circular orifice of diameter that is smaller than the outside diameter of the brush, and an applicator comprising a stalk 24 fitted at one end with a brush of the invention and at its other end with a handle element 25.

Naturally, the invention is not limited to the embodiments described.

In particular, bristles can be made having crosssections of other shapes.

The zones of preferential deformation are not necessarily zones of reduced thickness, for example they could be constituted by zones of a material having increased flexibility, in which case the bristle is made by co-extruding multiple plastics materials.

I claim:

1. A brush for applying makeup, in particular mascara, the brush comprising a core having two twisted lengths of wire with bristles held therebetween, wherein at least some of said bristles are constituted by bristles of deformable section, each having at least two zones of preferential deformation extending along the length thereof.

2. A brush according to claim 1, wherein the deformable-section bristles are made by extrusion and, in the extrusion configuration, are of a cross-section that is circular in outline.

3. A brush for applying makeup, in particular mascara, the brush comprising a core having two twisted [links] *lengths* of wire with bristles held therebetween, wherein at least some of said bristles are constituted by bristles of deformable section, each having at least two zones of preferential deformation extending along the length thereof and wherein the zones of preferential deformation are zones of reduced thickness.

4. A brush for applying makeup, in particular mascara, the brush comprising a core having two twisted [links] *lengths* of wire with bristles held therebetween, wherein at least some of said bristles are constituted by bristles of deformable section, each having at least two zones of preferential deformation extending along the length thereof and wherein at least one of the deformable section bristles has at least two portions that are movable relative to a third portion.

5. A brush according to claim 4, wherein at least one of the deformable-section bristles comprises three hinged-together portions, including a middle portion on which two side portions are hinged.

6. A brush according to claim 4, wherein at least one of the deformable-section bristles has two middle portions that are hinged to each other along one side and each of which is hinged along its opposite side to a respective side portion.

7. A brush for applying makeup, in particular mascara, the brush comprising a core having two twisted lengths of wire with bristles held therebetween, wherein at least some of said bristles are constituted by bristles of deformable section, each having at least two zones of preferential deformation extending along the length thereof and wherein the bristles are milled and present forks.

8. A brush for applying makeup, in particular mascara, the brush comprising a core having two twisted [links] *lengths* of wire with bristles held therebetween, wherein at least some of said bristles are constituted by bristles of deformable section, each having at least two zones of preferential deformation extending along the length thereof and wherein the zones of preferential deformation are made of a material that is different from the material(s) from which the remainder of the bristle is made.

9. A brush for applying makeup, in particular mascara, the brush comprising a core having two twisted lengths of wire with bristles held therebetween, wherein at least some of said bristles are constituted by bristles of deformable section, each having at least two zones of preferential deformation extending along the length thereof and having recess portions in which makeup can accumulate, said recess portions opening along the length of said bristles of deformable section.

10. Deformable-section bristles each having along its length at least two zones of preferential deformation.

11. Bristles according to claim 10, wherein the bristles are made by extrusion and present in their extrusion configuration a cross-section of circular outline.

12. Deformable-section bristles each having along its length at least two zones of preferential deformation, wherein each of the deformable-section bristles has at least three portions including a middle portion having two side portions hinged thereto.

13. A method of manufacturing a brush comprising a core made up of two twisted-together lengths of wire forming turns between which bristles are held, the method comprising the steps consisting in:

extruding shaped strips of plastics material having at least three portions interconnected by zones of preferential deformation;

cutting up said shaped strips to constitute deformable-section bristles;

placing the deformable-section bristles between two lengths of wire, each deformable-section bristle being of arbitrary angular orientation about its own longitudinal axis; and twisting together the two lengths of wire to form turns between which said bristles are held.

14. A method according to claim 13, further including the step consisting in milling the bristles.

15. A conditioning and applicator device for a makeup, the device comprising a reservoir containing said makeup, a wiper member, and an applicator comprising a stalk provided at one end with an applicator element and at its other end with a handle element also constituting a closure cap for the reservoir, wherein said applicator element is constituted by a brush for applying makeup, in particular mascara, the brush comprising a core having two twisted lengths of wire with bristles held therebetween, wherein at least some of said bristles are constituted by bristles of deformable section, each having at least two zones of preferential deformation extending along the length thereof.

*16. A brush for applying make-up, comprising a core having two twisted lengths of wire with bristles held therebetween, wherein at least some of said bristles are constituted by bristles of deformable cross-section, each having in cross-section at least three portions extending along a length of the bristle, each of said portions having an elongated shape, a length and two opposite ends, at least one of said three portions having an arcuate shape, the first portion being connected to one end of the second portion and one end of the third portion by two different regions of the length of the first portion.*

*17. A brush for applying make-up, comprising a core having two twisted lengths of wire with bristles held therebetween, wherein the brush has at least some of said bristles constituted by bristles of deformable cross-section, each having in cross-section at least three portions of elongated shape, each of said portions having a length and two opposite ends, a first portion of said three portions being connected to the other two portions at regions of said second and third portions other than a middle and an end of the length of said second and third portions.*

*18. A brush according to claim 16, wherein the second portion is not directly connected to the third portion.*

*19. A brush for applying make-up, comprising a core having two twisted lengths of wire with bristles held therebetween, wherein at least one of said bristles is constituted by bristles of deformable cross-section, each having in cross-section at least three portions extending along a length of the at least one bristle, each of said portions having an elongated shape, a length and two opposite ends, the first portion being connected to one end of the second portion and one end of the third portion by two different regions of the length of the first portion, wherein an axis of the first portion defines two opposite regions on each side of said axis and wherein the second and third portions are situated in different regions.*

*20. A brush for applying make-up, comprising a core having two twisted lengths of wire with bristles held therebetween, wherein at least one of said bristles is constituted by bristles of deformable cross-section, each having in cross-section at least three portions extending along a length of the at least one bristle, each of said portions having an elongated shape, a length and two opposite ends, the first portion being connected to one end of the second portion and one end of the third portion by two different regions of the length of the first portion, wherein said at least three portions define at least two recess portions opening along the length of the bristles, said at least two recess portions being separated by one of the three portions.*

*21. A brush for applying make-up, comprising a core having two twisted lengths of wire with bristles held therebetween, wherein the brush has at least some of said bristles constituted by bristles of deformable cross-section, each having in cross-section at least three portions of elongated shape having a length, a first portion of said three portions being connected to the other two portions at regions of said second and third portions other than a middle of the length of said second and third portions, wherein at least one of said three portions has an arcuate shape.*

*22. A brush for applying make-up, comprising a core having two twisted lengths of wire with bristles held therebetween, wherein the brush has at least some of said bristles constituted by bristles of deformable cross-section, each having in cross-section at least three portions of elongated shape having a length, a first portion of said three portions being connected to the other two portions at regions of said second and third portions other than a middle of the length of said second and third portions, wherein said at least three portions define at least two recess portions opening along the length of the bristles, said at least two recess portions being separated by one of the three portions.*

* * * * *